July 30, 1940.  E. A. RYDER  2,209,542
CRANKSHAFT CONSTRUCTION
Original Filed Aug. 4, 1936
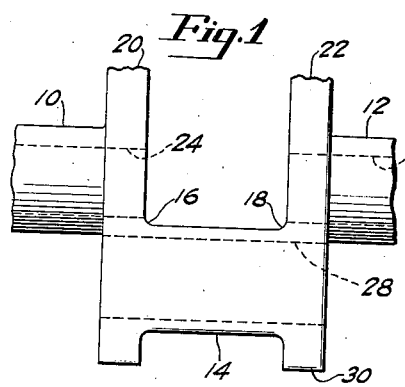
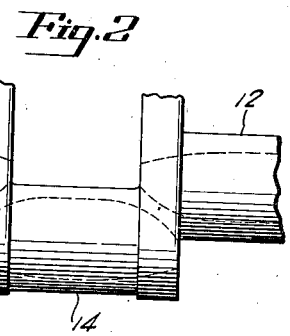
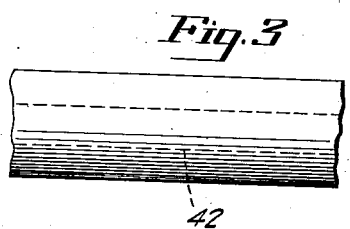
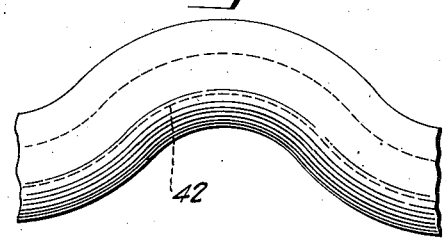
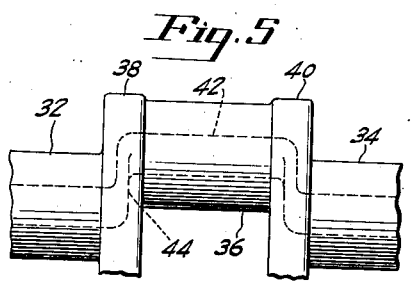
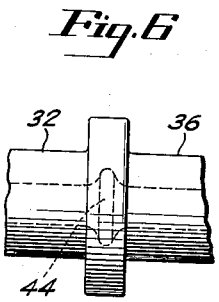
INVENTOR.
Earle A. Ryder
BY Harris G. Luther
ATTORNEY Patented July 30, 1940

2,209,542

UNITED STATES PATENT OFFICE 2,209,542

CRANKSHAFT CONSTRUCTION

Earle A. Ryder, West Hartford, Conn., assignor to United Aircraft Corporation, East Hartford, Conn., a corporation of Delaware Original application August 4, 1936, Serial No. 94,198. Divided and this application October 19, 1938, Serial No. 235,806

5 Claims. (Cl. 74—595)

This is a division of application Serial No. 94,198 filed August 4, 1936, by Earle A. Ryder, and relates to improvements in crankshaft construction and has particular reference to improvements in crankshafts for internal combustion engines.

An object of the invention resides in the provision of an improved crankshaft in which the crankpin or crankpins and the main bearing portions are made hollow and the crankpin or crankpins overlap the adjacent main bearing portions by an amount somewhat greater than the wall thicknesses of these portions.

A further object resides in the provision of an improved hollow crankshaft having cavities the intermediate portions of which are larger in cross-sectional area than the end portions.

Other objects and advantages will be more particularly pointed out hereinafter or will become apparent as the description proceeds.

In the accompanying drawing, in which like reference numerals are used to designate similar parts throughout, there has been illustrated two slightly different examples of what is now considered to be the preferred manner of carrying out the improved method for forging irregular metal objects, such as hollow crankshafts for internal combustion engines. The drawing, however, is for the purpose of illustration only and is not to be taken as limiting the scope of which is to be measured entirely by the scope of the appended claims.

In the drawing, Fig. 1 is an elevational view of a crankshaft at an intermediate stage of the forging process in one illustrative manner of carrying out the process constituting the idea of the invention.

Fig. 2 is an elevational view of the finished crankshaft after it has been formed in the manner first illustrated.

Fig. 3 is an elevational view of a hollow blank used in carrying out the forging process in a somewhat modified manner.

Fig. 4 is an elevational view of the blank at an intermediate stage of the stage of the second illustrative manner of carrying out the process.

Fig. 5 is an elevational view of the finished crankshaft formed in the manner illustrated in Figs. 3 and 4; and Fig. 6 is an elevational view of the crankshaft taken at an angle of 90 degrees to the view illustrated in Fig. 5.

Referring to the drawing in detail, and particularly to Figs. 1 and 2, a metallic blank is subjected to one or more initial forging operations to provide a partly finished article such as the crankshaft illustrated. As shown in Fig. 1, the crankshaft has been provided with main bearing portions 10 and 12, with a crankpin portion 14, with crank cheeks 16 and 18, and with counterweight extensions, broken away portions of which are indicated at 20 and 22. In this intermediate form, the crank cheeks 16 and 18 are extended so that there is no overlap of the area of the bore of the crankpin portion 14 with respect to the main bearing portions 10 and 12. While the crankshaft is in this intermediate stage, it is rendered hollow by providing the main bearing portions 10 and 12 with straight bores 24 and 26 and the crankpin portion with a similar straight bore 28. As the boring operation is performed before the overlap of the crankpin portion of the crankshaft with respect to the main bearing portions is completed, this operation may be performed with straight boring tools in a manner commonly employed in machine shop practice.

After the bores 24, 26 and 28 are provided in the crankshaft blank, the blank is subjected to further forging operations to provide the finished crankshaft, as illustrated in Fig. 2. During these further operations, the crank cheeks 16 and 18 particularly are swaged down from their elongated condition, as illustrated in Fig. 1, to their finished condition, as illustrated in Fig. 2. During this swaging operation, excess material which may be provided on the crank cheeks, as indicated at 30 in Fig. 1, is forced down into the main body portion of the finished crank cheek and at the same time the crankpin portion 14 is moved inwardly with respect to the main bearing portions 10 and 12 until the bore 28 of the crankpin portion overlaps the cross-sectional areas of the main bearing portions 10 and 12. During this process, the ends of the bores 24, 26 and 28 terminating in the crank cheeks 16 and 18 are reduced so that in the finished article the crankshaft cavities have intermediate portions of approximately the same diameter as the respective bores provided in the blank, as illustrated in Fig. 1, but have their end portions reduced so that an adequate amount of metal is provided in the crank cheeks between the crankpin portion and the main bearing portions to insure sufficient strength for the finished hollow crankshaft.

While it might be possible to drill out the cavities illustrated in Fig. 2 after the crankshaft was formed to its finished shape, it is obvious that the production of such irregular cavities in a metal body would be an extremely expensive and tedious operation requiring tools and methods at present unknown in regular machine shop practice. By means of the improved method described above, however, the desired result can be obtained by ordinary machine shop methods in an operating time consistent with the usual practice.

If desired, the interiors of the bores formed in the blank, as illustrated in Fig. 1, may be coated with a suitable material or the hollow portions may be filled with some material before the blank is subjected to further forging operations in order to prevent scaling or oxidizing of the interior of the hollow portions during the forging operations, subsequent to the boring operation, required to form the finished product.

In the slightly different manner of carrying out the improved method of forging irregular metallic bodies, as illustrated in Figs. 3, 4, 5 and 6, the blank from which the body, such as an engine crankshaft, is to be formed is made hollow or tubular before the blank is subject to any forging operation, such a hollow or tubular blank being illustrated in its initial straight condition in Fig. 3. The blank is then subjected to various forging operations to give it the desired form. In order to form an object such as a hollow crankshaft, the tubular blank is first formed to a generally U-shaped condition, as illustrated in Fig. 4, after which the main bearing portions 32 and 34, the crankpin portion 36, and the crank cheeks 38 and 40 are formed by subsequent operations. In carrying out the process in accordance with this second manner, the bore 42 is maintained at substantially its original diameter through the crankpin and the main bearing portions but is materially reduced at the portions which extend through the crank cheeks 38 and 40, as indicated at 44 in Figs. 5 and 6.

By employing the improved process described above, a crankshaft can be produced in which the bore of the crankpin portion 36 overlaps the cross-sectional area of the main bearing portions 32 and 34 and in which the cavities in the crankpin and the main bearing portions can, in spite of the above described overlap, be provided by usual machine shop methods without the necessity of resorting to special tools and extended and tedious boring or milling operations.

In the crankshaft form produced in the second described manner of carrying out the improved method, a crankshaft is produced which has a continuous bore extending therethrough without any openings to the exterior of the crankshaft, such a bore having the particular advantage that it may be used in its original form as a channel for supplying lubricant to the various parts of the engine connected with the crankshaft.

After the forging operations are completed, the object, such as the crankshaft mentioned, may be subjected to various machining, grinding, and polishing operations to bring it to its completely finished form.

From the above description, it will be observed that an improved process has been provided for forming irregular metallic objects, such as crankshafts in which the crankshaft comprises hollow overlapping offset bearing portions by providing such offset portions with bores or cavities at an intermediate stage in the formation of the object, before any extensive overlap of such offset portions is present, and subsequently providing the offset portions with the desired amount of overlap after such portions have been rendered hollow, at the same time changing the shape of the interiors of the hollow crankshaft portions as well as the exteriors to provide the proper structure between the various parts when reduced to their final overlapped condition.

While there have been illustrated and described two slightly different methods by means of which the improved process may be carried out, it is to be understood that the invention is not limited to the exact methods so illustrated and described but that such changes in the arrangement of the various steps of the method and in the performance of the steps themselves may be resorted to as would be suggested by this disclosure to a person skilled in the art.

Having now described the invention so that others skilled in the art may clearly understand the same, what it is desired to secure by Letters Patent is as follows:

What is claimed is.

1. As a new article of manufacture, an integral hollow forged steel crankshaft having overlapping offset bearing portions joined by intervening crank cheeks in which the hollow interior of the intermediate bearing portion is overlapped by the end bearing portions and the intervening crank cheek portions between the interiors of each two adjoining offset bearing portions are inclined across the width of said crank cheek from the end of one bearing portion to the adjacent end of the adjoining bearing portions.

2. As a new article of manufacture, an integral hollow forged crankshaft having thin walled overlapping offset bearing portions in which the overlap is substantially as great as the radius of one of said bearing portions.

3. As a new article of manufacture, an integral hollow forged steel crankshaft having overlapping offset portions in which the overlap is greater than the wall thickness of said offset portions and each offset section contains a cavity having an intermediate portion of substantially circular cross-section and end portions of non-circular cross-section.

4. As a new article of manufacture, an integral hollow crankshaft having overlapping offset bearing portions joined by intervening crank cheeks in which the hollow interior of the intermediate bearing portion is overlapped by the end bearing portions and the intervening crank cheek portions between the interiors of each two adjoining offset bearing portions are inclined across the width of said crank cheek from the end of one bearing portion to the adjacent end of the adjoining bearing portion.

5. As a new article of manufacture, a crankshaft having a hollow intermediate crankpin portion and integral hollow end crank bearing portions in which the ends of the bores of the crankpin and crank bearing portions are restricted by the overlap of the crankpin with the crank bearing portions, said restrictions being curved on an arc of relatively large radius to provide thickened walls at the adjoining ends of said portions.

EARLE A. RYDER.